Nov. 10, 1959 W. J. SHANAHAN 2,912,486

SUBSCRIPTION TELEVISION SYSTEM

Filed Jan. 12, 1955 5 Sheets-Sheet 1

INVENTOR
WILLIAM J. SHANAHAN

BY Cushman, Darby & Cushman
ATTORNEYS

Nov. 10, 1959 W. J. SHANAHAN 2,912,486

SUBSCRIPTION TELEVISION SYSTEM

Filed Jan. 12, 1955 5 Sheets-Sheet 2

INVENTOR
WILLIAM J. SHANAHAN

BY Cushman, Darby & Cushman
ATTORNEYS

Nov. 10, 1959 W. J. SHANAHAN 2,912,486

SUBSCRIPTION TELEVISION SYSTEM

Filed Jan. 12, 1955 5 Sheets-Sheet 3

INVENTOR
WILLIAM J. SHANAHAN

BY Cushman, Darby & Cushman
ATTORNEYS

Nov. 10, 1959 W. J. SHANAHAN 2,912,486

SUBSCRIPTION TELEVISION SYSTEM

Filed Jan. 12, 1955 5 Sheets-Sheet 4

INVENTOR
WILLIAM J. SHANAHAN

BY Cushman, Darby & Cushman
ATTORNEYS

Nov. 10, 1959 W. J. SHANAHAN 2,912,486

SUBSCRIPTION TELEVISION SYSTEM

Filed Jan. 12, 1955 5 Sheets-Sheet 5

INVENTOR
WILLIAM J. SHANAHAN

BY Cushman, Darby & Cushman
ATTORNEYS

United States Patent Office 2,912,486

Patented Nov. 10, 1959

2,912,486

SUBSCRIPTION TELEVISION SYSTEM

William J. Shanahan, New York, N.Y., assignor to Skiatron Electronics & Television Corporation, New York, N.Y., a corporation of New York Application January 12, 1955, Serial No. 481,423

16 Claims. (Cl. 178—5.1)

This invention pertains to scrambled television.

In copending patent applications of William J. Shanahan, Serial No. 255,555, filed November 9, 1951, now abandoned, and Serial No. 316,485, filed October 23, 1952, and of William J. Shanahan et al., Serial No. 418,642, filed March 25, 1954, and other patents and applications to which reference is made therein, television systems are described wherein two or more modes of the televised image may be established from time to time. The systems are such that if an unauthorized receiving apparatus is tuned to the channel in which the image is being transmitted, nothing but an unrecognizable blurr will appear on the display device of the said receiver.

In copending application Serial No. 255,555, there is generally described a system wherein the mode of the image is capable of change among two or more modes under control of commutation devices in the transmitter, and the receivers rely upon the transmission from time to time from the transmitter of a synchronization signal to maintain the commutation devices in step. In the specific embodiment described in detail in copending application Serial No. 255,555, the commutation synchronization signal is in the form of a regularly recurring elongated vertical synchronization pulse. Such elongation of a vertical pulse permits integration thereof to provide a driving pulse still usable for causing recycling of the vertical sawtooth oscillator at the receiver and, at the same time, a distinguishable pulse for effecting synchronization of the receiver commutation means.

In copending applications Serial No. 316,485 and Serial No. 418,642, systems are described which differ from those of copending application Serial No. 255,555, among other things, in that commutation devices at the transmitter and receivers are dispensed with, and instead, code signals are transmitted which themselves give information as to the particular mode then existing of the televised image with respect to a convenient reference, for example, the standard synchronizing pulses. In all of the systems of the above mentioned copending applications Serial No. 255,555, Serial No. 316,485 and Serial No. 418,642, the possibility of illicit use of the systems is further removed by a requirement for the completion of a decoding switching matrix in the receiver. For example, the decoding circuits at the receiver are incomplete until a record or business card having certain obscured printed circuits thereon is inserted into the decoding equipment. In this way, a given set of code signals for use with one card may serve to resolve a given image mode, while with another card for another program, the same set of code signals may be for resolving a different mode. With regard to the systems of copending application Serial No. 255,555, the replaceable card in the receiver (or other resettable switch arrangement) injects the factor that the occurrence of a commutation synchronizing pulse has a different meaning in terms of the instantaneous position of the commutator device for different cards.

The present invention particularly pertains to further embodiments of systems as reviewed hereinabove which employ commutation devices in the transmitter and receivers, and which rely upon the transmission of commutation synchronizing information to maintain the receiver decoding circuits in step with the coding circuits of the transmitter. More specifically, the present invention relates to further embodiments of means for conveying commutation synchronization, and also further embodiments of commuation means.

The present invention provides for the transmission of coded signals to maintain the synchronization of commutation devices to the transmitter and to the receivers, and coded or uncoded signals which occur at random times.

It is, therefore, a primary object of this invention to provide an improved scrambled television transmission system, and transmitters and receivers therefor, which utilize commutation means at the transmitter and receivers for establishing and translating two or more modes of the televised image.

It is a further object of the invention to provide such a television system and components therefor which includes means for transmitting randomly occurring commutator re-start signals.

It is a further object of the invention to provide such a system and components including the transmission of a commutator re-start signal in coded form, which signal may occur at regularly recurring intervals, or randomly.

Further objects and the entire scope of the invention will become fully apparent from the following description of exemplary embodiments and the appended claims.

It is to be understood that when modes of the image with respect to reference signals are referred to, the mode may take various forms. That is, one manner of creating a mode is to drive the camera with line driving pulses which are delayed by a predetermined time interval with respect to the transmitted horizontal synchronizing signals. In this case, in an unauthorized receiver the line sweep is triggered by the standard horizontal or line pulse. If all of the lines of a given field or frame are thusly triggered, and then the camera mode changes by changing the amount of delay in the camera driving pulses and the receiver is unaware of this change, the next field or frame in the receiver will be shifted horizontally. Changes in picture position from line to line, frame to frame, etc., among a number of positions, say four positions, results in complete smearing or blurring of the image. Another manner of establishing a mode is to drive the camera with standard driving pulses which conform to the transmitted horizontal synchronizing pulses and to pass the video output of the camera through a delay line which is tapped at a plurality of points. The modes are changed in this case from time to time by transmitting video signals tapped from the delay line at different points. Another manner of establishing modes is to transmit normal video signals at some times and the other times to invert the video signals. This technique can be carried further by suppressing a line of video and inserting therefor a line of noise and in this regard reference is made to my copending application Serial No. 452,095, filed August 26, 1954. Other techniques for establishing modes are described in the hereinabove mentioned copending applications and the generic concept of the term "modes" is thought to be clear without recital of further examples.

Particular embodiments of the invention relied upon to describe the generic components thereof may be best understood with reference to the accompanying drawings, wherein.

The present application constitutes a continuation-in-part of my above mentioned application Serial No. 255,555 and application Serial No. 207,928, filed January 26, 1951, now abandoned.

Figure 1:
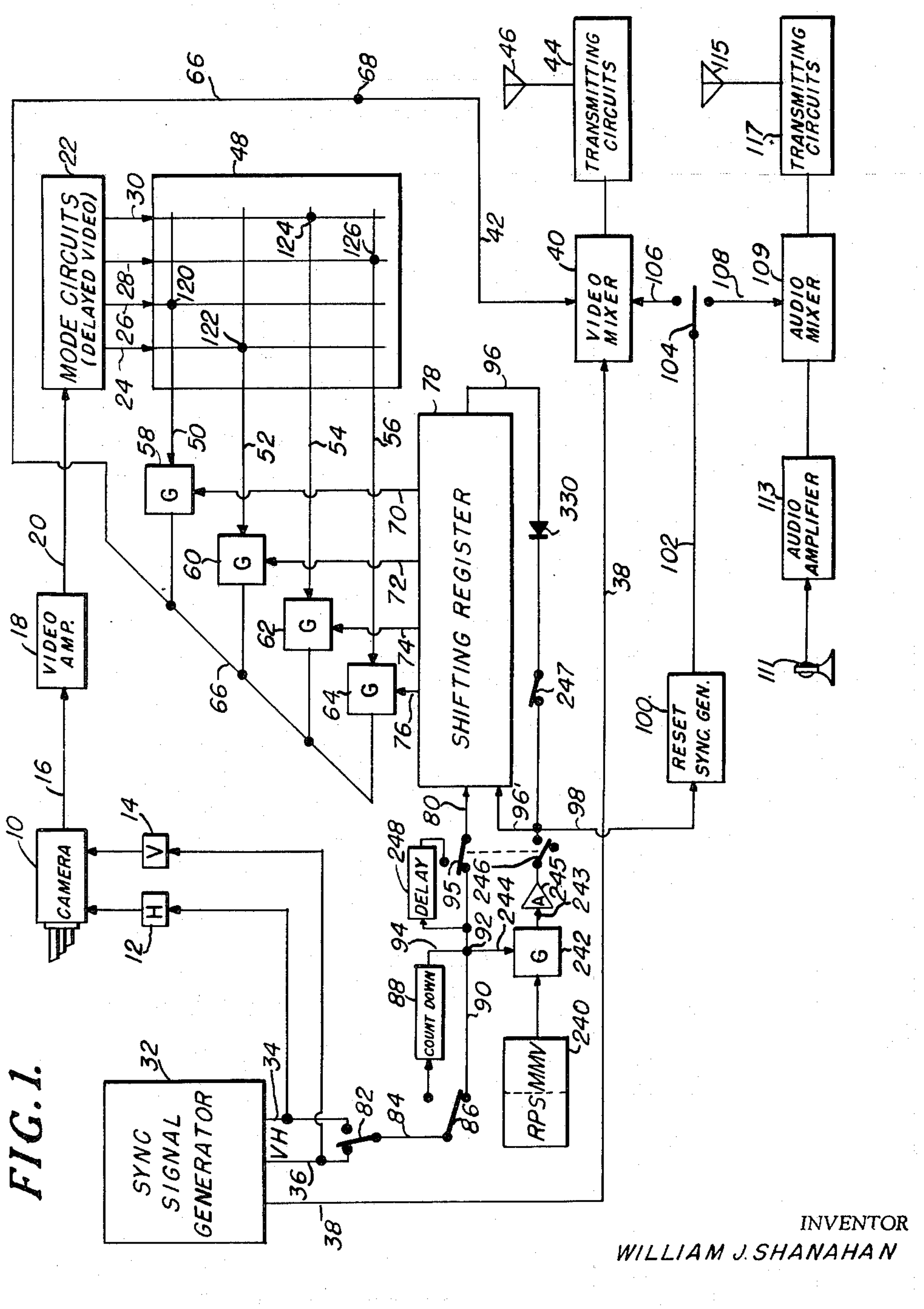
Figure 1 shows a first embodiment of apparatus for a transmitting station according to the present invention.

Now referring to Figure 1, circuitry is diagrammatically illustrated which will be employed to describe the generic aspects of the present invention and also a specific embodiment thereof, to further aid in an overall understanding of the invention. Reference character 10 designates a television camera operated under control of horizontal sawtooth signals generated in a horizontal sawtooth oscillator 12 and under control of vertical sawtooth signals generated by vertical oscillator 14. The video signals appear on line 16 and after amplification in amplifier 18 as may be desired are applied over line 20 to delay circuit 22 having a plurality of output lines 24, 26, 28 and 30. These lines may be tapped into the delay line at various points along the length thereof, the arrangement being such that video signals on line 20 be delayed various amounts and be ordinarily available on each of these output lines at different times. Line 24 may carry signals delayed by one time unit *t*; line 26 delayed by two units *t*; line 28 by three units *t*, and line 30 by four units *t*. The components as thus described may be generically considered to comprise what may be termed a mode circuit, in that it is possible to derive on a plurality of output lines, signals having to do with the image to be televised which have differing characteristics with respect to any convenient reference. The concept intended to be conveyed is that lines such as lines 24 and 26 from the mode circuit may, in another embodiment of the mod circuits, carry respectively, normal video and inverted video. An additional output line of the mode circuit such as line 28 may carry noise signals to be periodically inserted in accordance with copending application Serial No. 452,095.

With the intention to continue the generic concept of the circuitry, the description of the specific embodiment in Figure 1 now continues as follows:

The transmitter equipment may further include the usual generator circuit designated by reference character 32 for producing standard horizontal driving pulses on line 34, standard vertical driving pulses on line 36 and composite synchronizing signals on line 38. In the particular embodiment shown, the previously mentioned horizontal oscillator 12 is connected to line 34 and the vertical oscillator 14 is connected to the line 36. The line 38 extends to a mixing circuit 40 whereat video signals from line 42, and possibly other signals as will be described hereinbelow, may be mixed and then applied to transmitting circuits 44, and finally to the transmitter antenna 46 for radiation.

The output lines 24, 26, 28 and 30 of the mode circuit 22 are applied to a switching matrix illustrated within line 48, wherein certain connections are made to horizontally extending lines 50, 52, 54 and 56. Line 50 is connected as a first input to a gate circuit 58, line 52 is similarly connected to a gate circuit 60, line 54 to a gate 62, and line 56 to gate 64. The output line of each of these gates is connected in common to line 66 which connects at the junction 68 to the previously mentioned line 42 which is otherwise connected to the mixer circuit 40.

The gates 58, 60, 62, 64 each have a second input line connected thereto for enablement purposes, these being the line 70, 72, 74 and 76 respectively. The just mentioned lines form the output of a shifting register circuit 78 which is one embodiment of an electronic commutation means according to the present invention. The operation of shifting register 78 is such that when a series of input shifting pulses are applied to input line 80, one and then another, in succession, of the output lines 70, 72, 74 and 76 will carry a substantially higher potential than the others. In this manner, first one and then another of the gates 58, 60, 62 and 64 may be enabled or opened. Accordingly, while one of the gates is opened, video signals as delayed by an amount predetermined by the characteristics of delay line 72 and the connections in switching matrix 48, are applied over lines 66 and 42 to the mixer circuits 40. Upon the occurrence of the next pulse on input line 80, another one of the gates 58–64 will be opened, and thus, the mode of the video signals with respect to the standard synchronizing signals has been altered. If the mode circuit 22 is other than a video-delaying one, such as a video inversion circuit, the operation through gates 58–64 is entirely analogous.

The input pulses on line 80 may be derived as follows: A two-position switch 82 may be provided for connecting a line 84 to either the horizontal driving pulse line 34 or the vertical driving pulse line 36. A further two-position switch 86 may be provided for connecting the line 84 to either a count-down circuit 88 or to a line 90 which connects a junction 92 to the input line 80 through a switch 95. The junction 92 is otherwise connected over line 94 to the output of the count-down circuit 88. At this point it will be understood that the register 78 may be shifted by directly applying vertical or horizontal driving pulses thereto, or by applying a sub-multiple of either of these pulses by use of the count-down circuit 88. The count-down circuit 88 may itself be set to produce an output pulse on different numbers of input pulses.

According to a first embodiment of exemplary circuitry for the present invention, the switching of the register 78 to its final output, as represented by output line 70, may result in a reset or re-start signal appearing on line 96, for application thereof over line 96' to re-energize the first stage of the register 78. The signal on line 96 may be further applied over line 98 to the input of a generator circuit 100, which functions to provide a commutation synchronization signal from the transmitter to the receivers. This may be a circuit for generating signals for elongating the vertical synchronizing signal, as described in the aforementioned application Serial No. 255,555; or it may be a circuit for generating a burst of oscillations at a frequency which can be readily separated at the receivers. By means of a two-positioned switch 104, the synchronization signal on line 102 may be either applied over line 106 to mixer circuits 40, or may be applied over line 108 to be combined in mixer 109 with audio signals produced from microphone 111 and amplifier 113. The mixed signals are then radiated over antenna 115 after being modulated onto the audio carrier in the audio transmitting circuits 117.

In Figure 1, the dots 120, 122, 124 and 126 represent electrical contact between the vertical and horizontal lines of switching matrix 48. Such connections may, in practice, be made by manually operating switches, by the insertion of printed circuit cards into engagement with the sets of terminals, etc. It will be understood that different "codes" are established by changing the electrical connections from time to time.

Figure 2:
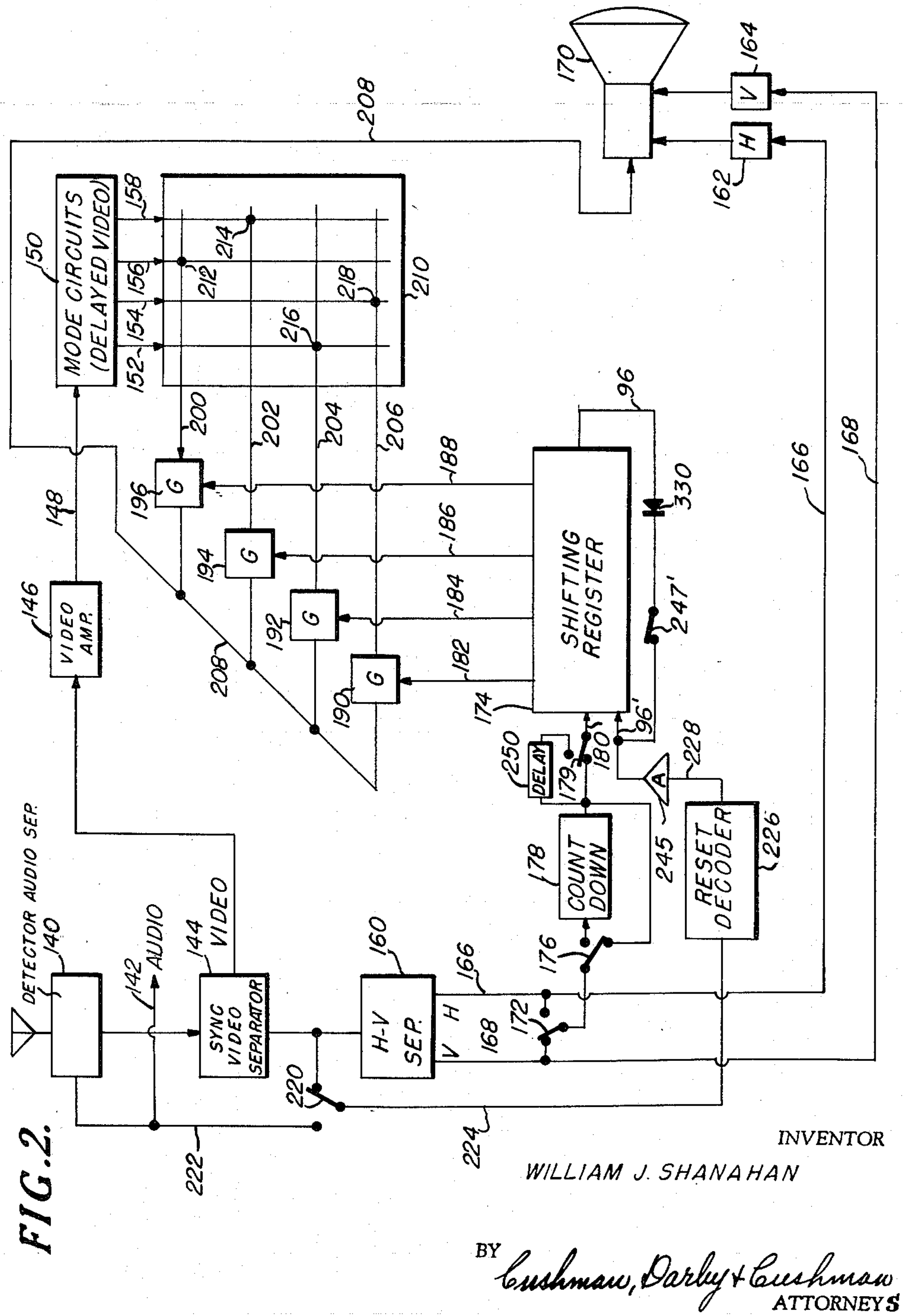
Figure 2 shows receiving equipment suitable for use with the apparatus of Figure 1.

Referring now to Figure 2, there is shown exemplary apparatus for detecting and receiving a signal transmitted by the apparatus shown in Figure 1 and for producing a picture which is intelligible. Equipment similar to that of Figure 1 is used in Figure 2 to convert the scrambled video signal back into one which may be displayed intelligently. The video signals may be detected in detector 140 wherein the audio signal is separated and carried on line 142 to the usual audio circuits (not shown). The remaining composite-video signal is separated as to the synchronization signals and the video intelligence in the separator 144, and the video signals are applied to an amplifier 146 and further over line 148 to a mode circuit 150. This circuit may be in all respects similar to the delay circuit 22 of Figure 1, the output lines 152, 154, 156 and 158 having outputs of the same type and reflecting the same mode as the corresponding lines 24–30 of Figure 1. That is, lines 152, 154, 156 and 158 may respectively carry video signals delayed by 1, 2, 3 and 4 time units $t$.

The synchronization signals emanating from separator 144 are applied to a horizontal and vertical separating circuit 160 to produce horizontal and vertical driving pulses. These pulses are then applied to the horizontal sweep oscillator 162 and the vertical sweep oscillator 164 over lines 166 and 168, respectively, for the control of the display tube 170. Switch 172 may be connected to either line 166 or 168 for the provision of either horizontal or vertical pulses to successively actuate a shifting register 174 in the same manner as described for the shifting register 78 in Figure 1. It will be understood that the switch 172 will be connected to the corresponding source of supply of pulses as is the switch 82 in Figure 1. Also, a switch 176 will be orientated in a manner similar to the switch 86 of Figure 1, and in its upper position will allow energization of the shifting register through count-down circuit 178 as a sub-multiple of the supply pulses from the separator 160 over line 180. In its lower position, switch 176 provides shifting pulses from the separator 160 directly to line 180 through switch 179 for actuation of the shifting register 174.

As in Figure 1, the shifting register has output lines 182, 184, 186 and 188 which respectively lead to gates 190, 192, 194 and 196 succesively. Signals appearing on lines 200, 202, 204 and 206 are gated, then, in a manner similar to the method described for Figure 1 with the outputs from the gates being connected in common on line 208 and further connected to the beam intensity control of the display tube 170. The signal on line 208 contains video intelligence and is connected to the display device on the control grid in the usual manner.

To obtain the video signals in the proper decoded mode with respect to the synchronization signals, a switching matrix within line 210 is placed between the outputs of the delay circuits 150 and the gates 190–196. The delay circuit output lines 152–158 are crossed over lines 200–206, some of which are shown connected as by dot 212. Where the mode circuits 22 and 150 are video delay circuits, as in the example now given, the connections within the switching matrix 210 bear a complementary relationship to the connections within switching matrix 48 of Figure 1. For example, it will be noted that in Figure 1 line 50 is connected to line 26 from the delay unit by the dot connection 120. The line 26 may be considered as the output from the delay unit 22 which carries a signal delayed by two time units $t$, or $2t$. Gate 58 when enabled will have an output to line 66, in this case, of 2 units delay. In the same manner, considering line 24 as carrying the video signal at $t$ delay, and lines 28 and 30 carrying the signal at $3t$ and $4t$ delay, respectively, the lines 52, 54 and 56 according to the dotted electrical connections 122, 124 and 126 will carry delayed signals of 1, 3 and 2 units, respectively. In order to convert and resynchronize these delayed signals back into a video signal which can be intelligently displayed, the switch matrix 210 of Figure 2 has dotted electrical connections 212, 214, 216 and 218 which are complementary to the dotted electrical connections 120 to 126 of Figure 1 with respect to the delay times provided by the output lines of delay unit 150. In this manner, each of the modes issuing from delay circuit 150 may have the same total delay after conversion in the matrix and issuance through their respective gates to line 208. For example, the dotted connection 124 of Figure 1 connects line 52 to a signal delay of $4t$, and in Figure 2 line 204 connects to a signal delay of $t$, completing the total complement of five delay units $t$. In like manner, line 50 (Fig. 1) receives a signal delayed by $t$ and line 200 (Fig. 2) receives a signal delayed by $3t$ totalling five units; line 54 (Fig. 1) receives a 4 unit delayed signal and line 204 (Fig. 2) receives a 1 unit delayed signal since dot 216 connects line 204 to the 1 unit delay output line 152; and line 56 (Fig. 1) receives a 3 unit delay to which is added a 2 unit delay by connection of line 206 (Fig. 2) by dot 218 to output line 154.

It will be recalled from Figure 1 that the reset signal appearing on line 96 not only resets the shifting register 78, but also was applied over line 98 to the reset generator circuit 100 which provided a commutation synchronization signal to be transmitted. This signal is distinctive and may be, for example, a signal similar to the horizontal or vertical synchronizing signals but of different amplitude, length, frequency, phase, etc., and as described above may be mixed in the video circuit 40 or applied to the audio system over line 108. In Figure 2, switch 220 is provided to select the distinctive signal and in its left position obtains the signal from detector 140 over line 222 when the distinctive signal is transmitted through the audio circuits; if the distinctive signal is transmitted through the video circuits, switch 220 in its right position obtains the distinctive signal from separator 144. Regardless of which manner the distinctive signal is transmitted, it will be carried over line 224 into a reset detector 226 for detection and generation of a signal which may be applied to shifting register 174 over line 228. The reset decoder 226 may modify the distinctive signal in any manner necessary for causing a reset of the shifting register 174.

In Figure 1, there is shown a reset line 96 feeding back into line 96′ to reset the shifting register 78 when the register reaches its last position. A similar resetting line may be utilized with the shifting register 174 in Figure 2 if such is desired. Reset decoder 226 would only need to be used during the initial operation of the receiver, since if the automatic reset line were used, the shifting register 174 would be synchronized by the first received distinctive signal. As a source of confusion, the shifting register 174 could include extra stages and a reset path 96, 96′. Accordingly, if the reset generator is not relied upon, the receiver commutator will go out of step.

It will be apparent from the above discussion that the received transmission will cause the shifting register 174 to operate in such a manner that will allow the video signal to be applied to the display tube with an even left-hand margin, so that the picture is without blurring. An unauthorized receiver which does not have means to re-synchronize the video signals with the synchronizing signals, will have an unintelligible picture display due to constant shifting of the video lines.

The reset signal above described with regard to the specific disclosure of Figures 1 and 2 occurs at regular intervals and consequently an unauthorized receiver might perhaps be adjusted to detect the periodicity of the reset signal. To avoid this possibility there is shown in Figure 1 means for varying at random the occurrence times of the reset signal. A random or noisy pulse source and monostable multivibrator 240 may be arranged to produce square waves at unpredictable times for enabling gate 242. Therefore, pulses at junction point 92, whether they be vertical or horizontal pulses or a submultiple thereof, may be conducted over line 244 through gate 242 (when enabled) and through an amplifier 245 and switch 246 (when closed) to reset the shifting register over line 96′ at random times. The reset path 96, 96′ may be opened at switch 247 if desired, but preferably is used to permit re-starting of register 78 if no random reset pulse has occurred during a cycle of register 78. The reset pulses from gate 242 may also be applied to reset signal generating circuit 100 for transmission of a distinctive reset signal over line 102, as previously described.

With a random pulse source 240, the reset signal may appear when any one of the shifting register output lines 70–76 are energized and will consequently reset and restart the register 78 at unpredictable and varying times. The monostable multivibrator in circuit 240 may have a time constant equal to the time period between respective portions of successive shifting pulses at junction 92. There may be provided in line 80 a delay 248 by moving switch 95 to its upward position for the purpose of delaying a pulse arriving at junction 92 and allowing that same pulse to pass through gate 242 and to reset the shifting register 78 before the same pulse arrives on line 80 to shift the register (see description of Figure 3 supra for further explanation). A corresponding delay may be utilized in the receiver as shown by selective insertion by switch 179 of the delay unit 250 in line 180 of Figure 2.

Since the reset signal when produced at random as illustrated in Figure 1, is distinctive in some manner as previously mentioned, no additions need be made to the receiver of Figure 2 (except the delay 250 just mentioned), the reset decoder 226 being only modified as necessary to decode and apply the received distinctive reset signal. The reset path 96, 96′ may be opened by switch 247′ (Fig. 2) if desired, or such path may be entirely eliminated from the circuit.

Figure 3:
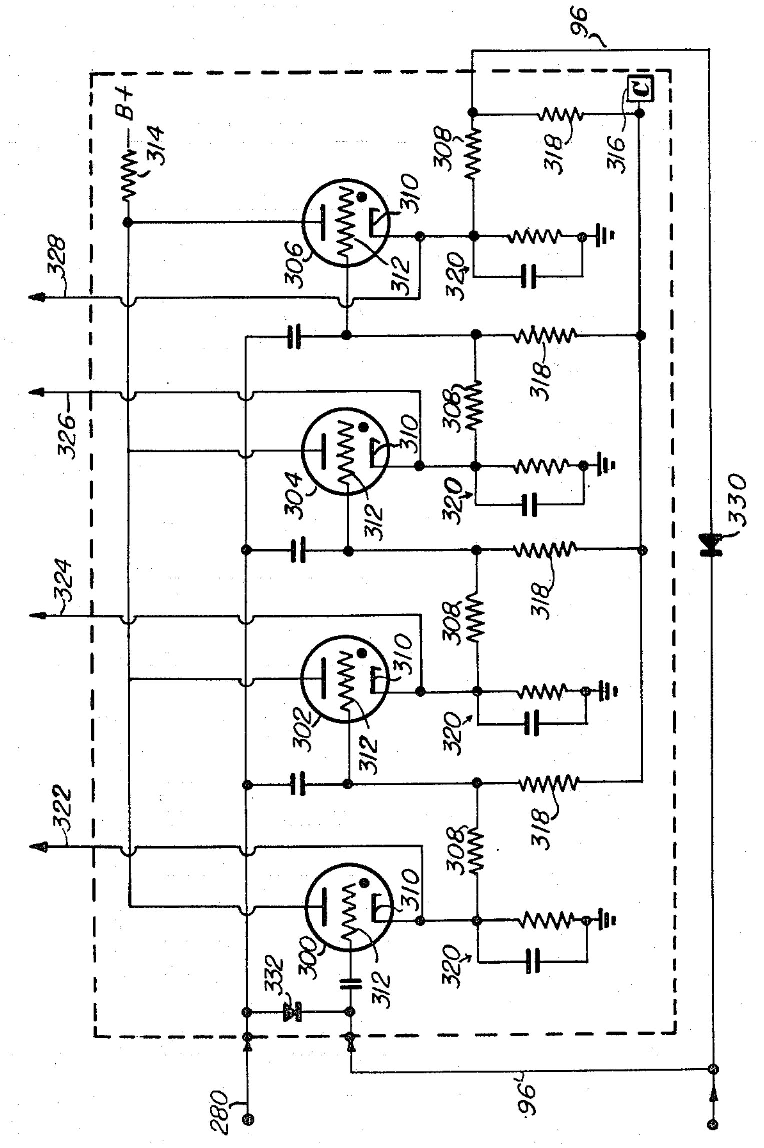
Figure 3 shows details of a shifting register usable with the circuits of Figures 1, 2, 4, and 5.

There will now be described with reference to Figure 3 suitable circuitry for use within shifting registers 78 (Fig. 1) and 174 (Fig. 2). No limitation is intended by the showing of the circuitry in Figure 3, since those skilled in the art will appreciate that other well known circuits may be used as shifting registers. In Figure 3 there are four gas-filled triode tubes popularly known as thyratrons. These are indicated by character numbers 300, 302, 304 and 306. As is well known this type tube has two possible stable states for all grid potentials; that is, fully a conducting state and a completely non-conducting state. The grid of a thyratron by itself serves to trigger the tube from the non-conducting to the fully conducting state after which the grid loses complete control of the action of the thyratrons until the tube is extinguished by other means. Each thyratron 300–306 is connected to its enabling or left-hand thyratron as a cathode follower by resistances 308 from the cathode 310 of each thyratron to the grid 312 of the succeeding thyratron, with the last thyratron 306 being connected through its resistor 308 over line 96 and 96′ (the reset line of Figure 1) to the grid 312 of tube 300. Each tube is connected to a common source of plate potential and has a common plate load resistor 314. The cathode bias potential 316 connects to cathodes 310 in parallel through a resistor 318 in series with resistor 308. Upon there being sufficient potential at the grid of one of the thyratrons 300–306, the tube conducts and builds up a voltage across the self-biasing resistor condenser combination 320. The resistors 308 and 318 provide a voltage divider circuit and the grid of the next tube on the right of the one conducting is consequently raised in potential. However, this tube though primed will not conduct until additional voltage appears upon its grid. Incoming pulses arriving on line 280 (which corresponds to lines 80 and 180 of Figures 1 and 2 respectively) raise the grid of the primed tube sufficiently to cause conduction in that tube. When one of the tubes starts to conduct, the excessive current drained through the common plate load resistor 314 reduces the plate voltage of the tube immediately on the newly conducting tube's left to a point such that conduction will stop. The potential at the cathode of the tube that cuts off remains nearly the same when the plate voltage drops to cut it off, although said cathode potential decays in RC circuit 320 immediately after conduction stops. The voltages on output lines 322, 324, 326 and 328 will then indicate when a tube is conducting and will provide the necessary and enabling potentials successively. Since the pulses arriving on line 280 are either vertical or horizontal pulses and occur during the fly-back time, the slight overlap in energization of the output lines 322 to 328 will be immaterial.

In the modification shown in Figure 1 whereby a random noise source is utilized to reset the shifting register 78, the random reset pulses arriving through switch 246 and on line 96′ passes to grid 312 of tube 300. In a shifting register of the type shown in Figure 3, the reset pulse should be of an amplitude sufficient by itself to cause conduction in the first tube 300. To increase the amplitude of the reset pulse passing gate 242 of Figure 1, an amplifier 245 may be inserted in line 243 of Figure 1. Any reset pulse arriving from the random source in box 240 may be prevented from passing to line 96 by a unidirectional device 330. The reset pulse arriving on line 96′, either from switch 246 or from line 96, is prevented from passing to line 280 by another unidirectional element 332. This assures that the reset pulse from the noisy pulse source in box 240 passes only to the first tube 300.

Figure 4:
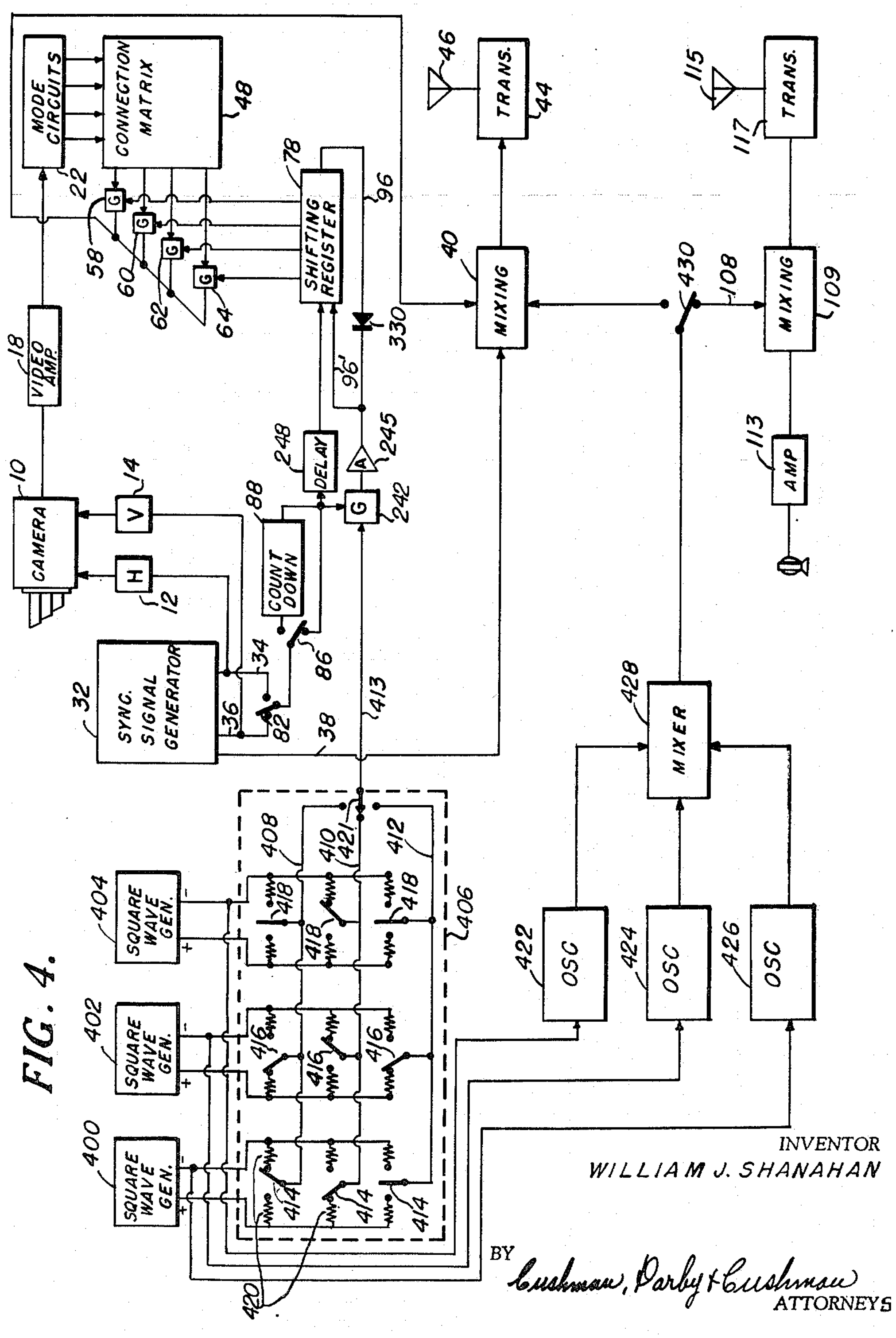
Figure 4 shows a second embodiment of apparatus for a transmitting station in accordance with the invention.
Figure 5:
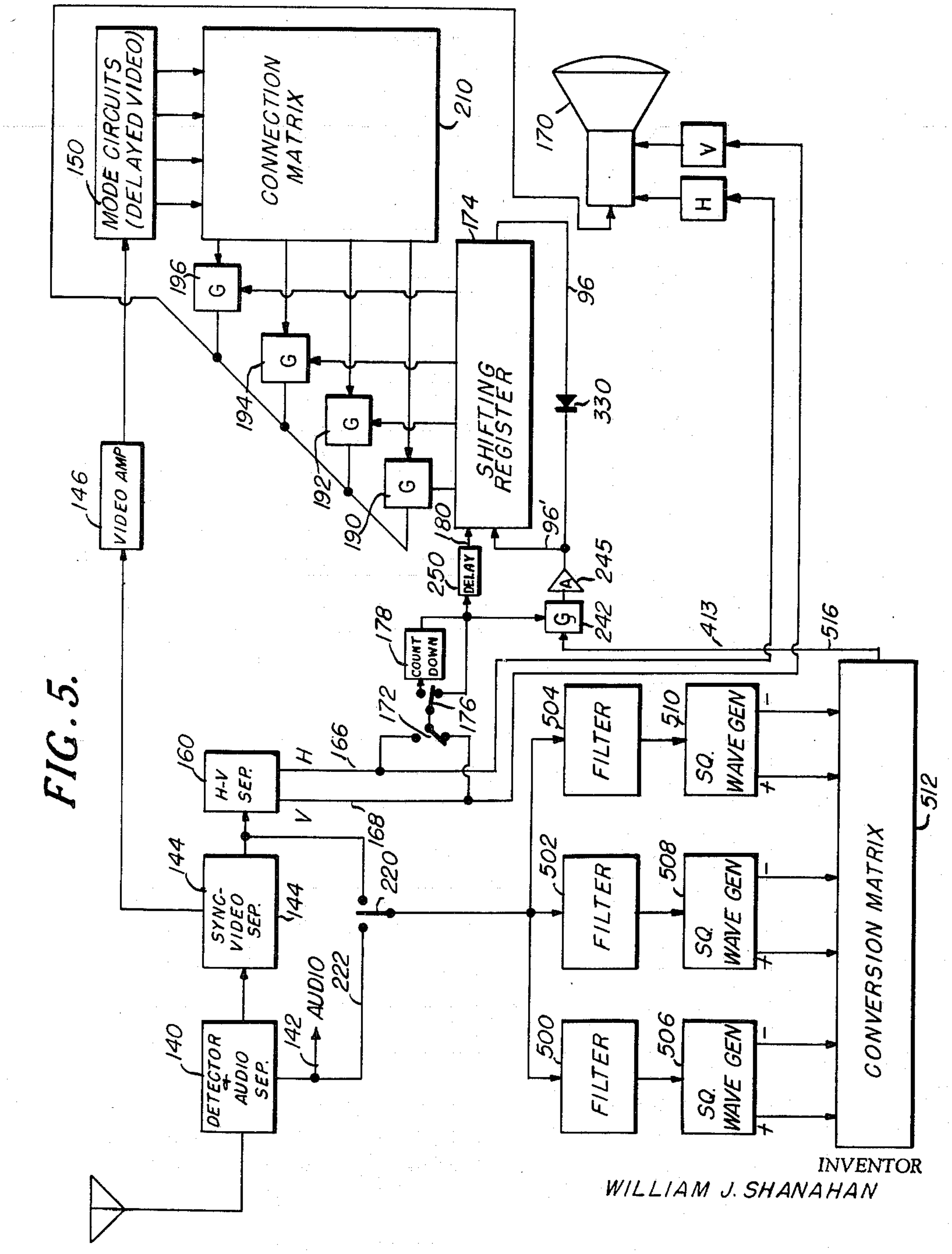
Figure 5 shows receiving apparatus for use with the apparatus shown in Figure 4.

The nature of the synchronization reset signal may further be complicated by circuitry such as shown in Figures 4 and 5. Figure 4 illustrates coding apparatus that may be used at the transmitter, and Figure 5 decoding apparatus at the receiver. In general, the coding circuitry of Figure 4 is similar to Figure 2 of each of previously mentioned copending applications Serial No. 316,485 and Serial No. 418,642, and the operation of the circuitry will be explained with regard thereto. All of Figure 1 is included in Figure 4 with the exception of the reset generator 100 and the random noise source 240 which is replaced by a more complicated system. Parts of Figure 4 are given like numbers as corresponding parts of Figure 1. To selectively produce a reset pulse, three square wave generators 400, 402 and 404 are utilized. Each of these generators has two output lines designated + and —. It will be understood by those skilled in the art that whenever a square wave on one output line has a high value, the square wave on the other output line has a low value, in effect, forming a square wave envelope. The square wave generators 400–404 may be controlled by vertical or horizontal driving pulses as shown in Figures 2, 5 and 6 of copending application Serial No. 316,485 or may consist of noisy pulse sources transformed into square waves as shown in Figures 7 and 8 of Serial No. 316,485 and in Figures 2, 3*a* and 3*b* of Serial No. 418,642. The output of each square wave generator is applied to a switching matrix within the dash line 406. Each line 408, 410, 412 has connected thereto a set of three switches 414, 416 and 418 for selecting through an appropriate resistor 420 the positive or negative square wave arriving from associated square wave generator. If on line 410 switch 414 is in its left-hand position, switch 416 in its right-hand position, and switch 418 in its right-hand position, voltage division across the three resistors 420 involved will hold the potential on a line 413 to gate 242 below a maximum potential except in one case, that being where the (+) line of generator 400 and the (—) line of generators 402 and 404 are at their high levels. Obviously, change in one or more of the settings of switches 414, 416 and 418 will change the necessary situation of generators 400, 402 and 404. Thus a "code" concept is introduced. Differing codes as set by the switches on lines 408 and 410 may be connected into the circuit by switch 421.

In order to give an indication to an authorized receiver of when the reset pulse should occur, the output of the square wave generators 400–404 may be connected to oscillators 422, 424 and 426, which may produce three separate audio or above audio frequencies. Reference is again made to Figure 2 of Serial No. 316,485 and Serial No. 418,642 for operation of oscillators in this manner. The output of the oscillators 422–426 is combined in mixer 428, the output of which is applied to switch 430. The mixed signal at this point may be applied to either the audio mixer 109 or the video mixer 40. Copending application Serial No. 316,485 describes and illustrates the transmission groups of coding signals in the audio circuits and Serial No. 418,642 illustrates in Figures 2, 3*a* and 3*b* apparatus for mixing a coded signal with the synchronizing signals in proper relationship during the vertical pulse interval. Further explanation of this technique is therefore thought to be unnecessary in this application.

To reproduce an intelligent picture when the reset signal occurrence time is coded by apparatus as in Figure 4, an apparatus shown in Figure 5 may be utilized. The receiver of Figure 2 is incorporated in Figure 5 and like parts are given like numbers. The coded reset signal is selected by switch 220 from the audio signal line 222 or from the synchronizing signals from the separator 144 as the case may be, in conformity with the position of switch 430 in Figure 4. In either case, the coded oscillations are presented to filters 500, 502 and 504 to reproduce the respective frequency oscillations generated by the oscillations 420–426 of Figure 4. Square wave generators 506, 508, 510 are then energized by the outputs of the respective filters and produce square waves in accordance with the filtered oscillations. The output of the square wave generators 506, 508 and 510 correspond to the output of the square wave generators 400–404 of Figure 4. Consequently, to regain the reset pulse occurrence time a switching matrix 512 is utilized, this being similar to the matrix 406 in Figure 4, it being understood that a record card may be employed to complete the circuits. When a coded record card is inserted in the matrix 512 and the connections are made corresponding to the connections made by the switches 414–416 to Figure 4, an intelligible picture will be produced on the display tube 170. Again, the reset path 96, 96′ may be opened.

Now regarding the operation of the various embodiments described hereinabove, the following observations can be made: First, considering the case of the operation of a system utilizing the apparatus of Figures 1 and 2 while relying upon regularly occurring register reset pulses, a continuous stream of shifting pulses will be applied to the shifting registers via lead 80 in Figure 1 and 180 in Figure 2. For example, vertical driving pulses may be applied to the respective count-down circuits 88 and 170 for a reduction in the ratio 4:1. Thus a different one of the four shifting register output lines will be enabled during every period from one vertical driving pulse to the next. Every time the shifting register at the transmitter reaches the end of its cycle, with switch 247 closed a pulse will exist on line 96 and be further applied via line 96′ to recycle or re-start the register. Concurrently, a pulse will be produced by reset detector circuit 226 in Figure 2 for insuring the restarting of receiver shifting register 174. It will be apparent that once properly started, when switch 247 is closed on the Figure 2 apparatus, the shifting register 174 should remain in synchronism. However, the transmission of the reset pulse not only serves as a means of properly starting the receiver in synchronism, but will insure continuous operation.

For operation of the apparatus of Figures 1 and 2 when the random pulse source 240 is relied upon to produce a randomly occurring re-start pulse at the transmitter the switch 247 may be closed to insure that the shifting register will cycle if by chance no reset pulse is generated during a particular cycle. However, complexity can be added to the coding by opening switch 247 to permit the register to remain in its final state until a re-start pulse does occur. It will be apparent the great numbers of expedients which can be incorporated, and which are within the scope of the present invention, to compound the encoding of the system. At the receiver the switch 247′ will preferably be left open or the reset path 96, 96′ entirely eliminated so that the receiver is dependent upon detection of the re-start signal to maintain the shifting register 174 in synchronism with the register 78 at the transmitter. It is to be emphasized that in all cases the ability to code the video transmission by predetermined connections within the matrices 48 and 210 is in addition to the fact that an improperly equipped receiver will fail to properly respond to register reset signals.

Now referring to Figures 4 and 5, the basic concept to be conveyed thereby is that the reset signal itself may be transmitted in coded form. Thus, an unauthorized receiver is presented not only with the problem of maintaining the commutation device in synchronism, but with the problem of properly generating reset pulses. Again assuming the shifting pulses to be directly applied vertical driving pulses via switches 82 and 86 as set in Figure 4, the shifting register 78 will be enabled on a different output lead for every vertical driving pulse input. However, assuming the square wave generators 400, 402 and 404 to be responding to randomly occurring signals, by changing states only during vertical retrace times (at randomly occurring vertical retrace times) the proper combination of signals on the square wave generator output lines in relation to the setting of the switches 414, 416 and 418 in use, will open the gate 242 (Fig. 4) and gate 242 will remain open for an entire period between vertical driving pulses, or for a shorter period as may be sufficient, so that one of the driving pulses available from switch 86 may be amplified in amplifier circuit 248 and applied over line 96′ to reset the register 78. As will be understood, this reset pulse may find the register 78 at some intermediate point of its entire cycle. Now referring to the receiving circuits of Figure 5, it will be apparent that if the receiver has been unaware of the reset of the register 78 at the transmitter, the register 174 at the receiver will proceed out of step.

It will be appreciated that the matrix 512 employed to uncode the reset pulse may be completed by an insertable record card, and also the matrix 210 (Fig. 5) may be similarly completed by a record card. Indicia for both purposes may appear on one card, or separate cards, etc., as may be desired.

The foregoing detailed description of specific embodiments of the invention has been given for purposes of illustration only, and is not intended to limit the scope of the invention. The true scope of the invention is intended to be set forth by the appended claims.

What is claimed is:

1. In transmitting means for a scrambled picture transmission system, means for generating picture signals, means coupled thereto for generating a plurality of different modes of said picture signals, and means coupled to and responsive to the aforesaid means for transmitting a different mode of the picture signals during different time periods at a rate sufficient to render an unauthorized receiver display unintelligible, the just mentioned means including commutation means having at least three different states for changing from time to time at the aforesaid rate which of said modes is transmitted, means coupled with said commutation means for transmitting signals for maintaining synchronization of commutation means at receivers, and changeable matrix means connected between the mode generating means and the transmitter commutation means for determining which mode is transmitted for given states of the transmitter commutation means.

2. In receiving means for receiving a scrambled picture transmission wherein picture signals are transmitted in one of a plurality of different modes during different time periods which occur at a rate sufficient to render an unauthorized receiver display unintelligible and wherein signals are transmitted representing the operation of commutation means at the transmitting means; means for resolving the different modes of said picture signals, means including commutation means coupled to the resolving means for determining from time to time the mode resolved in the resolving means, means for detecting the transmitted signals and coupled with the commutation means for maintaining synchronization of the receiver commutation means with corresponding commutation means at the transmitting means, and changeable matrix means connected between the mode resolution means and the receiver commutation means for determining the mode to be resolved for given states of the commutation means.

3. Transmitting means as in claim 1 wherein the means for maintaining synchronization of commutation means at the receiver includes means for generating and transmitting coded complex signal combinations.

4. Transmitting means as in claim 3 wherein the means for generating said complex signal includes a plurality of signal generators connected to control the commutation means and includes a further changeable matrix means connected between the plurality of generators and the commutation means.

5. In receiving means as in claim 2 wherein the synchronization signals are coded complex signal combinations, wherein the means for detecting said coded complex signal combinations includes a plurality of detector circuits for decoding the components of the complex signal for controlling the commutation means, and includes a further changeable matrix means connected between the commutation means and the outputs of said detector circuits.

6. In transmitting means for a scrambled picture transmission system, means for generating picture signals, means coupled thereto for generating a plurality of different modes of said picture signals, and means coupled to and responsive to the aforesaid means for transmitting a different mode of the picture signals during different time periods which occur at a rate sufficient to render an unauthorized receiver display unintelligible, means including commutation means having a plurality of states for selecting from time to time which of said modes is transmitted, means coupled to said commutation means for driving the commutation means with shifting signals, means for generating randomly occurring signals for interrupting cycles of the commutation means at random times, and means for transmitting at least one signal from time to time based on said randomly occurring signals for causing synchronous interruption of cycles of commutation means at receivers.

7. In receiving means for receiving a scrambled picture transmission wherein picture signals are transmitted in one of a plurality of different modes during different time periods which occur at a rate sufficient to render an unauthorized receiver display unintelligible and wherein randomly occurring signals are transmitted representing random interruptions of cycles of commutation means at the transmitting means; means for resolving the different modes of said picture signals, means coupled to said resolving means and including commutation means having a plurality of states for selecting from time to time which of said modes is resolved in the resolution means, means for driving the commutation means with shifting signals, means for detecting said transmitted random signals, and means responsive thereto for generating signals for interrupting cycles of the receiver commutation means at random times.

8. In transmitting means for a scrambled picture transmission system, means for generating picture signals, means coupled thereto for generating a plurality of different modes of said picture signals, and means coupled to and responsive to the aforesaid means for transmitting a different mode of the picture signals during different time periods at a rate sufficient to render an unauthorized receiver display unintelligible, means including commutation means having a plurality of different states for selecting from time to time which of said modes is transmitted, means for generating and transmitting coded complex signal combinations for maintaining synchronization of commutation means at receivers, and changeable matrix means connected between the means for generating said coded complex signal combinations and the transmitter commutation means for determining which mode is transmitted for a given state of the transmitter commutation means.

9. In receiving means for receiving a scrambled picture transmission wherein picture signals are transmitted in one of a plurality of different modes during different time periods which occur at a rate sufficient to render an unauthorized receiver display unintelligible and wherein coded complex signal combinations are transmitted representing the operation of commutation means at the transmitting means; means for resolving the different modes of said picture signals, means coupled to said resolving means and including commutation means for determining from time to time the mode resolved in the resolution means, means for detecting the transmitted coded complex signal combinations for maintaining synchronization of the receiver commutation means with corresponding commutation means at the transmitting means, and changeable matrix means connected between the detecting means and the receiver commutation means for determining the mode to be resolved for given states of the commutation means.

10. In transmitting apparatus for a scrambled picture transmission system, means for generating picture signals, means coupled thereto for generating a plurality of different modes of said picture signals, a shifting register having a plurality of output lines, a plurality of gates, each gate coupled to one output line, a plurality of input lines, each line coupled to one gate, a plurality of output lines from said mode generating means, changeable matrix means interconnecting the last mentioned output lines and said input lines, means coupled commonly to the output of said gates for transmitting the picture signals delivered therethrough, means for generating synchronizing signals, means for connecting at least one type of synchronizing signals as inputs to said shifting register whereby the output lines thereof successively enable said gates, means for resetting said shifting register with a reset signal, and means for generating a signal in response to said reset signal and for coupling the so-generated signal for transmission purposes.

11. Apparatus as in claim 10 wherein said reset signal is the end output from said shifting register.

12. Apparatus as in claim 10 wherein the means for resetting said shifting register includes means for randomly generating at least a part of the reset signals.

13. Apparatus as in claim 10, wherein the means for resetting said shifting register includes means for generating a plurality of square waves, averaging circuit means and a second changeable matrix for producing said reset signal, the means for generating a signal to be transmitted in response to a reset signal including a plurality of oscillators responsive to said square waves for producing a plurality of different tones.

14. In receiving apparatus for receiving a scrambled picture transmission wherein picture signals are transmitted in one of a plurality of different modes during different time periods which occur at a rate sufficient to render an unauthorized receiver display unintelligible, and wherein signals are transmitted representing the operation of commutation means at the transmitting apparatus, the improvement comprising means for resolving different modes of said picture signals, a shifting register having a plurality of output lines, a plurality of gates, each gate coupled to one output line, a plurality of input lines, each line connected to one gate, a plurality of output lines from the mode resolution means, changeable matrix means coupled between the last mentioned output lines and said input lines, receiver display means coupled commonly to the outputs of said gates, means for producing synchronizing signals from the transmitted signals, means for applying at least one type of said synchronizing signals as input signals to said shifting register whereby the output lines thereof successively enable said gates, and means responsive to the transmitted signals representing the operation of the commutation means at the transmitting apparatus for causing said shifting register to be at least initially synchronized with said commutation means by providing thereto at least one reset signal.

15. Apparatus as in claim 14 wherein said shifting register is reset by its own end output signal after initial synchronization of the register.

16. Apparatus as in claim 14 wherein the means for resetting said shifting register includes means for generating a plurality of square waves in response to the transmitter synchronizing signals, and further includes a second changeable matrix for producing at least a part of the reset signals.

References Cited in the file of this patent

UNITED STATES PATENTS

| | | |
|---|---|---|
| 2,414,101 | Hogan et al. | Jan. 14, 1947 |
| 2,472,774 | Mayle | June 7, 1949 |
| 2,510,046 | Ellett et al. | May 30, 1950 |
| 2,656,407 | Herrick et al. | Oct. 20, 1953 |
| 2,664,460 | Roschke | Dec. 29, 1953 |
| 2,697,741 | Roschke | Dec. 21, 1954 |

Notice of Adverse Decision in Interference

In Interference No. 91,432 involving Patent No. 2,912,486, W. J. Shanahan, SUBSCRIPTION TELEVISION SYSTEM, final judgment adverse to the patentee was rendered Nov. 13, 1964, as to claims 8 and 9.

[*Official Gazette March 30, 1965.*]